US011694525B2

(12) United States Patent
Buchholz et al.

(10) Patent No.: US 11,694,525 B2
(45) Date of Patent: Jul. 4, 2023

(54) HAZARD DETECTOR WITH OPTICAL STATUS INDICATOR

(71) Applicant: CARRIER CORPORATION, Palm Beach Gardens, FL (US)

(72) Inventors: Matthew J. Buchholz, Canon City, CO (US); Kenneth J. Mott, Colorado Springs, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 474 days.

(21) Appl. No.: 16/629,832

(22) PCT Filed: Jul. 9, 2018

(86) PCT No.: PCT/US2018/041265
§ 371 (c)(1),
(2) Date: Jan. 9, 2020

(87) PCT Pub. No.: WO2019/014110
PCT Pub. Date: Jan. 17, 2019

(65) Prior Publication Data

US 2021/0158663 A1 May 27, 2021

Related U.S. Application Data

(60) Provisional application No. 62/530,722, filed on Jul. 10, 2017.

(51) Int. Cl.
*G08B 5/38* (2006.01)
*G08B 17/103* (2006.01)
(Continued)

(52) U.S. Cl.
CPC ................ *G08B 5/38* (2013.01); *G08B 5/36* (2013.01); *G08B 17/06* (2013.01); *G08B 17/103* (2013.01); *G08B 17/117* (2013.01)

(58) Field of Classification Search
CPC . G08B 5/36; G08B 5/38; G08B 17/06; G08B 17/10; G08B 17/11; G08B 17/103;
(Continued)

(56) References Cited

U.S. PATENT DOCUMENTS 3,916,209 A 10/1975 Steele et al.
4,340,885 A * 7/1982 Chavis ................ G08B 17/117 73/31.05
(Continued)

FOREIGN PATENT DOCUMENTS

CN 202178726 U * 3/2012

OTHER PUBLICATIONS

Amiclaus: “Activity: LED as light sensor”, May 1, 2017; URL:https://wiki.analog.com/university/courses/electronics/electronics-lab-led-sensor?rev=1493016886; 5 Pages.
(Continued)

*Primary Examiner* — Andrew W Bee
(74) *Attorney, Agent, or Firm* — Cantor Colburn LLP

(57) ABSTRACT

A life safety device includes a housing and a light transmission device disposed within the housing. A first end of the light transmission device is visible at the exterior of the housing. The life safety device additionally includes a transmitter for generating a light. The transmitter is positioned within the housing adjacent the light transmission device. A receiver measures ambient light around the life safety device. The receiver is positioned within the housing adjacent the light transmission device.

16 Claims, 7 Drawing Sheets

(51) Int. Cl.

| | |
|---|---|
| ***G08B 17/117*** | (2006.01) |
| ***G08B 5/36*** | (2006.01) |
| ***G08B 17/06*** | (2006.01) |

(58) Field of Classification Search

CPC .... G08B 17/107; G08B 17/117; G08B 17/12; G08B 17/125

See application file for complete search history.

(56) References Cited

U.S. PATENT DOCUMENTS

| | | | | |
|---|---|---|---|---|
| 4,827,244 | A | 5/1989 | Bellavia et al. | |
| 5,998,929 | A | 12/1999 | Bechtel et al. | |
| 7,791,595 | B2 | 9/2010 | Altonen et al. | |
| 8,049,427 | B2 | 11/2011 | Altonen et al. | |
| 9,288,877 | B2 | 3/2016 | Pratt et al. | |
| 9,332,610 | B2 | 5/2016 | Kuo et al. | |
| 9,345,098 | B2 | 5/2016 | Joseph et al. | |
| 9,549,448 | B2 | 1/2017 | Pope et al. | |
| 9,553,451 | B2 | 1/2017 | Zacharchuk et al. | |
| 9,572,221 | B2 | 2/2017 | Chang et al. | |
| 9,622,321 | B2 | 4/2017 | Creasman et al. | |
| 2004/0095253 | A1 | 5/2004 | Tanguay | |
| 2004/0112114 | A1 | 6/2004 | Penney et al. | |
| 2004/0189461 | A1* | 9/2004 | Tice | G08B 29/183 340/522 |
| 2012/0286940 | A1 | 11/2012 | Carmen, Jr. et al. | |
| 2012/0321321 | A1* | 12/2012 | Riesebosch | H04B 10/116 398/118 |
| 2014/0292506 | A1 | 10/2014 | Rapeanu et al. | |
| 2014/0333928 | A1 | 11/2014 | Erdtmann | |
| 2015/0339896 | A1 | 11/2015 | Stagg | |
| 2016/0033115 | A1 | 2/2016 | Savage, Jr. et al. | |
| 2017/0085319 | A1* | 3/2017 | Latham | H04L 12/40 |
| 2017/0184292 | A1 | 6/2017 | Weeks et al. | |
| 2018/0212371 | A1* | 7/2018 | Xu | H04R 1/028 |

OTHER PUBLICATIONS

International Search Report for Application No. PCT/US2018/041265; dated Jan. 2, 2019; 8 Pages.

Invitation to Pay Additional Fees; Application No. PCT/US2018/041265; dated Oct. 30, 2018; 14 Pages.

Written Opinion of the International Search Authority for Application No. PCT/US2018/041265; dated Jan. 2, 2019; 12 Pages.

European Office Action; European Application No. 18746450.8; dated Dec. 9, 2021; 7 pages.

International Preliminary Report on Patentability; International Application No. PCT/US2018/041265; International Filing Date: Jul. 9, 2018; Date of Issuance: Jan. 14, 2020; 12 pages.

European Office Action for European Application No. 18746450.8; Report dated Nov. 23, 2022 (pp. 1-5).

* cited by examiner

HAZARD DETECTOR WITH OPTICAL STATUS INDICATOR

CROSS-REFERENCE TO RELATED APPLICATIONS

This application is a 371 U.S. National Stage application of PCT/US2018/041265, filed Jul. 9, 2018, which claims the benefit of U.S. Provisional Application No. 62/530,722, filed Jul. 10, 2017, both of which are incorporated by reference in their entirety herein.

BACKGROUND

The disclosure relates to a life safety device for detecting one or more conditions, such as smoke and carbon monoxide for example. More specifically, the disclosure relates to a life safety device including a visual indicator for identifying each of the sensed conditions.

Regulations require the use of indicators to indicate the current status of a life safety detector. However, the current indicators used are small relative to the housing and are not aesthetically pleasing. Therefore, an objective of the disclosure is to provide an apparatus which visually indicates to a user a status of the device in a more aesthetically pleasing manner.

BRIEF DESCRIPTION

According to one aspect of the invention, a life safety device includes a housing and a light transmission device disposed within the housing. A first end of the light transmission device is visible at the exterior of the housing. The life safety device additionally includes a transmitter for generating a light. The transmitter is positioned within the housing adjacent the light transmission device. A receiver measures ambient light around the life safety device. The receiver is positioned within the housing adjacent the light transmission device.

In addition to one or more of the features described above, or as an alternative, in further embodiments a light source of the life safety device is operable as both the transmitter and the receiver.

In addition to one or more of the features described above, or as an alternative, in further embodiments the at least one light source is a light emitting diode.

In addition to one or more of the features described above, or as an alternative, in further embodiments comprising a control system operably coupled to the transmitter and the receiver, wherein the control system determines an operating mode of the life safety device in response to the ambient light measured.

In addition to one or more of the features described above, or as an alternative, in further embodiments the life safety device is operable in a daytime mode or a night time mode.

In addition to one or more of the features described above, or as an alternative, in further embodiments comprising a plurality of light sources including a first light source, a second light source, wherein the first light source has a first color, and the second light source has a second color, the first color and the second color being distinct.

In addition to one or more of the features described above, or as an alternative, in further embodiments in the daytime mode, the first light source and the second light source are operable as the transmitter.

In addition to one or more of the features described above, or as an alternative, in further embodiments comprising a third light source, wherein in the daytime mode, the third light source is operable as the receiver.

In addition to one or more of the features described above, or as an alternative, in further embodiments the third light source is radially offset from the first light source and the second light source relative to the light transmission device.

In addition to one or more of the features described above, or as an alternative, in further embodiments in the night time mode, the third light source is operable as both the transmitter and the receiver.

According to another embodiment, a method of operating a life safety device includes detecting ambient light adjacent the life safety device, sensing a condition via at least one detector of the life safety device, and illuminating an indicator visible at an exterior of the life safety device in response to the sensed condition. Detecting ambient light and illuminating the indicator are performed by a light source.

In addition to one or more of the features described above, or as an alternative, in further embodiments the light source is a light emitting diode.

According to yet another embodiment, a life safety device includes a housing and a detector coupled to the housing. The detector senses one or more conditions adjacent the life safety device. A visual warning system is disposed within the housing. The visual warning system includes an indicator at least partially visible at the exterior of the housing and at least one light source for illuminating the indicator. A color used to illuminate the indicator is selected in response to the condition sensed by the detector.

In addition to one or more of the features described above, or as an alternative, in further embodiments the at least one light source includes a first light source, a second light source, wherein the first light source has a first color, and the second light source has a second color, the first color and the second color being distinct.

In addition to one or more of the features described above, or as an alternative, in further embodiments the first light source is used to illuminate the indicator in response to a first condition sensed by the detector and the second light source is used to illuminate the indicator in response to a second condition sensed by the detector.

In addition to one or more of the features described above, or as an alternative, in further embodiments both the first light source and the second light source are used to illuminate the indicator in response to a third condition sensed by the detector.

In addition to one or more of the features described above, or as an alternative, in further embodiments the indicator includes a bi-directional, passive light transmission device positioned generally adjacent the at least one light source.

In addition to one or more of the features described above, or as an alternative, in further embodiments the at least one light source is operable as a receiver for measuring ambient light adjacent the life safety device, the receiver being positioned within the housing adjacent the light transmission device.

In addition to one or more of the features described above, or as an alternative, in further embodiments the at least one light source is a light emitting diode.

According to another embodiment, a method of operating a life safety device includes detecting ambient light adjacent the life safety device, sensing a condition via at least one detector of the life safety device, and illuminating an indicator visible at an exterior of the life safety device in response to the sensed condition. The indicator is illuminated with a first color in response to sensing a first condition and the indicator is illuminated with a second color, distinct from the first color in response to sensing a second condition.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
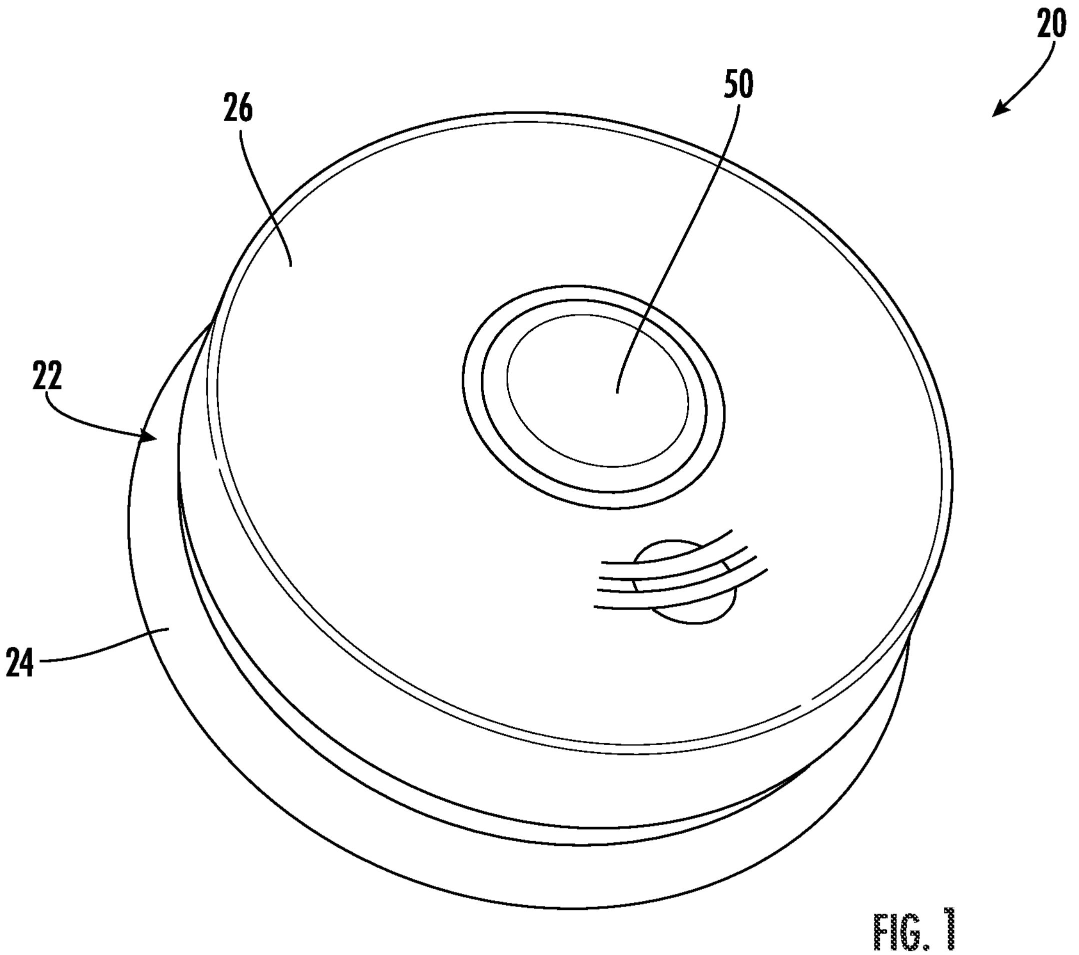
FIG. 1 is a perspective view of an example of a life safety device according to an embodiment.
Figure 2:
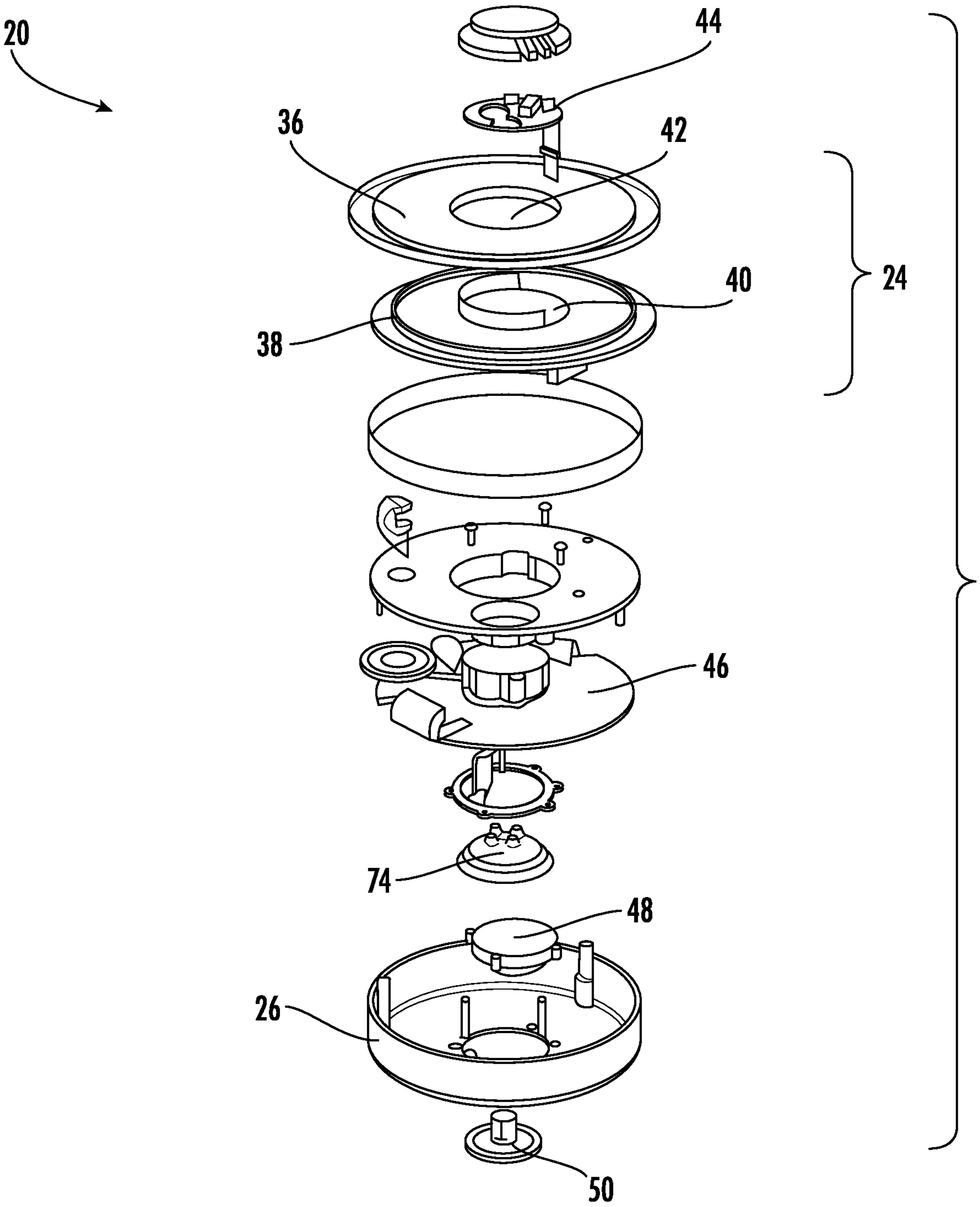
FIG. 2 is an exploded view of the life safety device of FIG. 1 according to an embodiment.

Referring now to FIGS. 1 and 2, an example of a life safety device 20 is illustrated. The life safety device 20 includes a housing assembly 22 having a first, upper housing portion 24 and a second, lower housing portion 26 that is removably connected to the first housing portion 24. The life safety device 20 further includes a control system 30 including at least one detection circuit 32 and at least one alarm circuit 34 to be described in more detail below with reference to FIGS. 3 and 4. When the first and second housing portions 24, 26 are connected, the first and second housing portions 24, 26 enclose the control system 30 and other components necessary to operation of the device 20. As used herein, the terms "upper", "lower", and the like are in reference to the device 20 in use as it is mounted on a surface, such as a ceiling in a building for example. Therefore, the upper housing portion 24 is typically closer to the ceiling than the lower housing portion 26, and the lower housing portion 26 is typically the portion of the device 20 that will face downward toward the floor of the building. In some embodiments device 20 may be mounted on a wall such that upper housing portion 24 is closer to the wall than the lower housing portion 26, and the lower housing portion 26 is typically the portion of the device 20 that will face outward toward the interior space of the room or space to be monitored.

In the non-limiting embodiment of FIG. 2, the upper housing portion 24 includes a base plate 36 and a trim plate 38 disposed upwardly adjacent the base plate 36. The trim plate 38 is typically positioned adjacent to or flush with a mounting surface, such as a ceiling or wall for example. As shown, both the trim plate 38 and the base plate 36 include a centrally located opening 40, 42 respectively, having a similar size and shape. In embodiments where the device 20 is "hardwired", a power source 44 located within the mounting surface, such as an AC power supply for example, may extend into the aligned openings 40, 42.

A printed circuit board 46 is disposed generally between the base plate 36 and an adjacent surface of the lower housing portion 26. The printed circuit board 46 includes the circuitry and/or components associated with the at least one detection circuit 32 and at least one alarm circuit 34. In embodiments where the life safety device 20 is "hardwired", the printed circuit board 46 is directly connected to the power source 44. In such embodiments, part of the printed circuit board 46 may extend into the central opening 40, 42 of the upper housing portion 24 to connect to the power source 44. The printed circuit board 46 may be adapted to receive one or more batteries sufficient to provide power thereto to operate the device 20 for an extended period of time. The power provided by the batteries may be the sole source of power used to operate the device 20, or alternatively, may be supplemental to the power source 44, for example in the event of a failure or loss of power at the power source.

A sound generation mechanism 48 may be disposed between the printed circuit board 46 and the lower housing portion 26. The sound generation mechanism 48 receives power from the printed circuit board 46 to generate a noise in response to detection of a condition. Coupled to the lower housing portion 26 is an actuatable mechanism 50, such as a button. The actuatable mechanism 50 may be a button configured to perform one or more functions of the life safety device 20 when actuated. Examples of operations performed via the actuatable mechanism 50 include, but are not limited to, a press to test function, a smoke alarm "hush", a low battery "hush", and end of life "hush", radio frequency enrollment of additional life safety detectors 20 such as in a detection system including a plurality of life safety detectors configured to communicate with one another wirelessly, and to reset the unit once removed from its packaging for example.

In the illustrated, non-limiting embodiment, the actuatable mechanism 50 is received within an opening formed in the lower housing portion 26, and is operably coupled to a control system 30 of the printed circuit board 46. Although the actuatable mechanism 50 is shown positioned at the center of the lower housing portion, embodiments where the actuatable mechanism 50 is located at another position are also within the scope of the disclosure. Further, it should be understood that in embodiments where the actuatable mechanism 50 performs multiple operations, there may be only a single actuatable mechanism 50 located on the detector 20 and no other mechanism is required. Alternatively, the detector 20 may include a plurality of actuatable mechanisms 50, each being operable to perform a distinct function or the actuatable mechanism 50 may be divided to form a plurality of actuatable mechanisms. In embodiments where the detector 20 includes a plurality of separate actuatable mechanisms 50, the actuatable mechanisms 50 may be located at any location relative to the housing 22.

Figure 3:
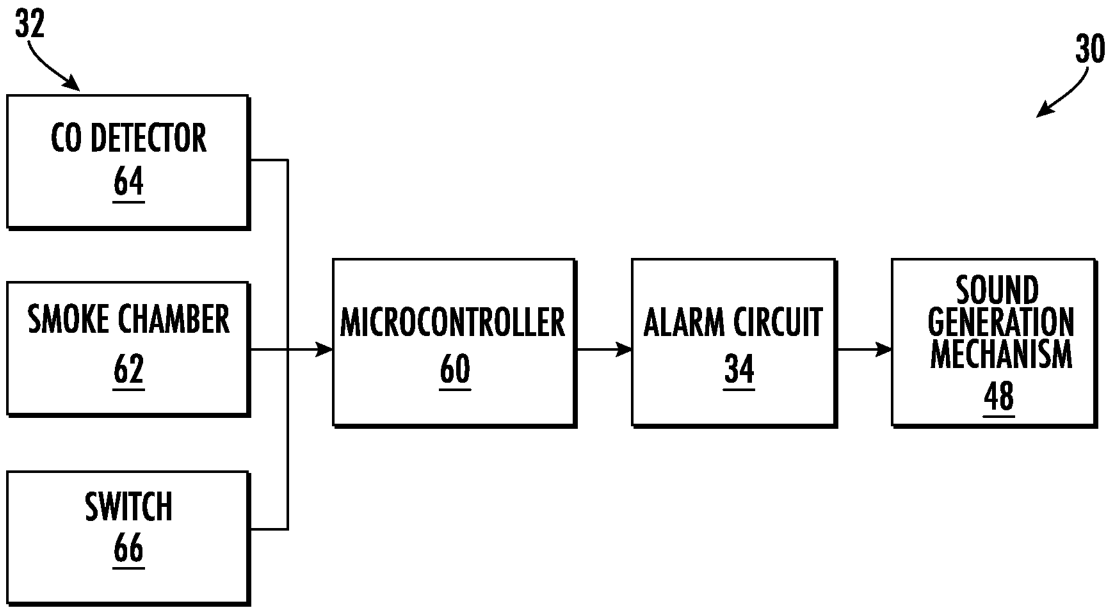
FIG. 3 is a schematic diagram of a control system of a life safety device according to an embodiment.

With reference FIG. 3, a schematic diagram of an example of a control system 30 of the device 20 is shown in more detail. The control system 30 includes a microcontroller 60 operable to receive an input from the at least one detector circuit 32, for example from a conventional ion or photoelectric smoke chamber 62 and a carbon monoxide detector circuit 64. However, it should be understood that the detector 20 may be adapted for detection of a variety of hazardous conditions, including but not limited to smoke, carbon monoxide, explosive gas, and heat for example. It will also be understood from the following that the particular technology of the detector circuits 62, 64 are not a limiting aspect of the invention. Further, while the discussion herein refers to a microcontroller, one skilled in the art will recognize that the functionality and intelligence associated with this element may be alternatively embodied in a microprocessor with associated input/output and buffering circuits, in a programmable logic device (PLD), in an application specific integrated circuit (ASIC), of other intelligent, programmable device. Therefore, the use of the term microcontroller herein shall be construed to cover all of these alternative structures as well.

The microcontroller 60 also receives an input from a user-actuated switch 66 input, for example coupled to the actuatable mechanism 50. The microcontroller 60 utilizes the inputs from these components 62, 64, 66 to generate an output alarm condition when the sensed environmental conditions so dictate. A single alarm circuit 34 is utilized to broadcast via the sound generation mechanism 48 the appropriate audible sound, depending on which condition has been detected. The alarm circuit 34 may include both tone and synthesized voice message generation capabilities, or may be a simple piezo-electric type device. It should be understood that the life safety device 20 illustrated and described herein is intended as an example only and that a life safety device 20 having any configuration and capability is contemplated herein.

Figure 4:
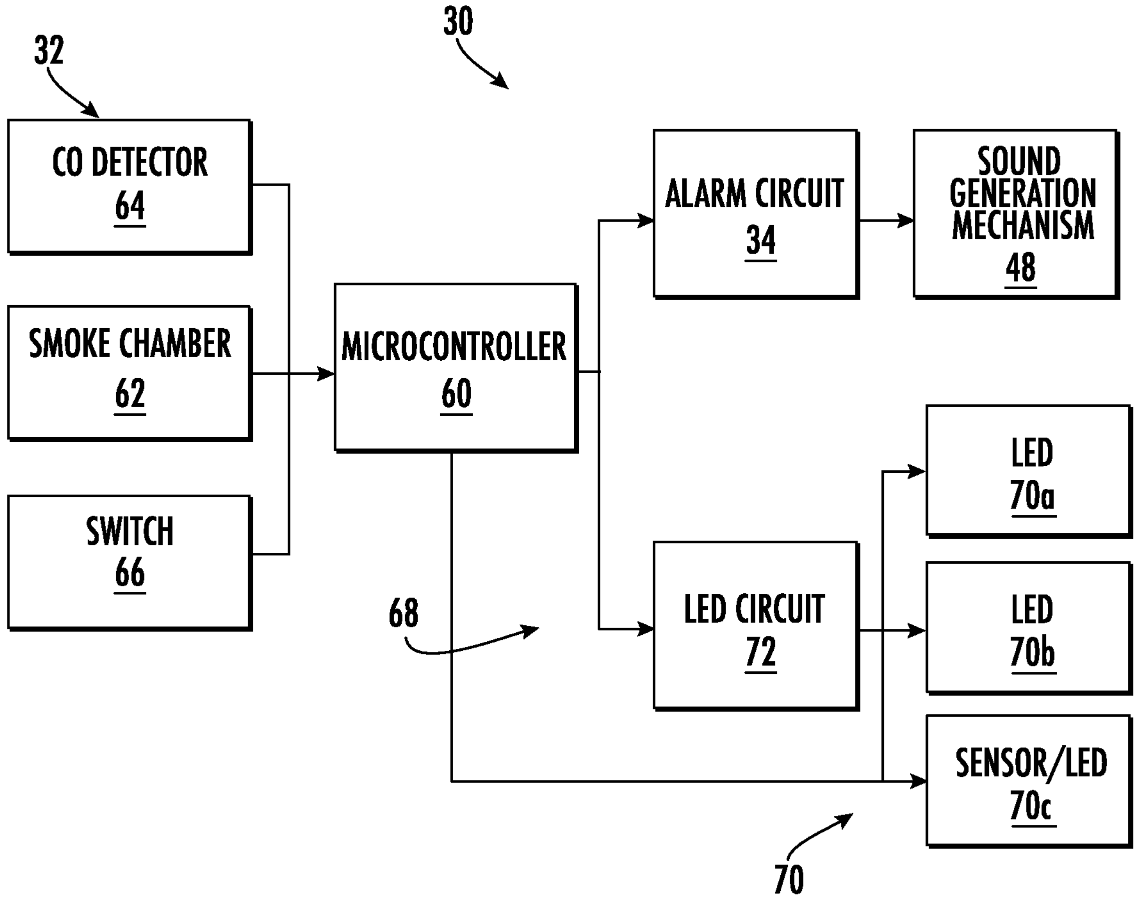
FIG. 4 is a schematic diagram of a control system of a life safety device according to another embodiment.

With reference now to FIG. 4, in an embodiment, the control system 30 of the device 20 additionally includes a visual warning system 68 including at least one light source 70, such as a light emitting diode (LED) for example, and a circuit 72 for operating the light source 70. The light generated by the at least one LED 70 is visible through the housing 22, such as through the lower housing portion 26 for example. The at least one light source 70 may be controlled to generate distinct outputs in response to a plurality of detected conditions. Although light source 70 is described herein as an LED, in some embodiments other types of illumination sources may be used in alternative or in addition to an LED.

In an embodiment, the device 20 includes a light transmission device 74, such as a light pipe for example, positioned within the housing 22 generally between the printed circuit board 46 and the lower housing portion 26 (see FIG. 2). Inclusion of the light transmission device 74 enhances the visibility of the light output by the LED 70 at the exterior of the device 20. The light transmission device 74 is a passive device formed from a clear or generally transparent plastic material and is configured to diffuse and evenly distribute the light generated by the at least one LED 70.

Figure 5:
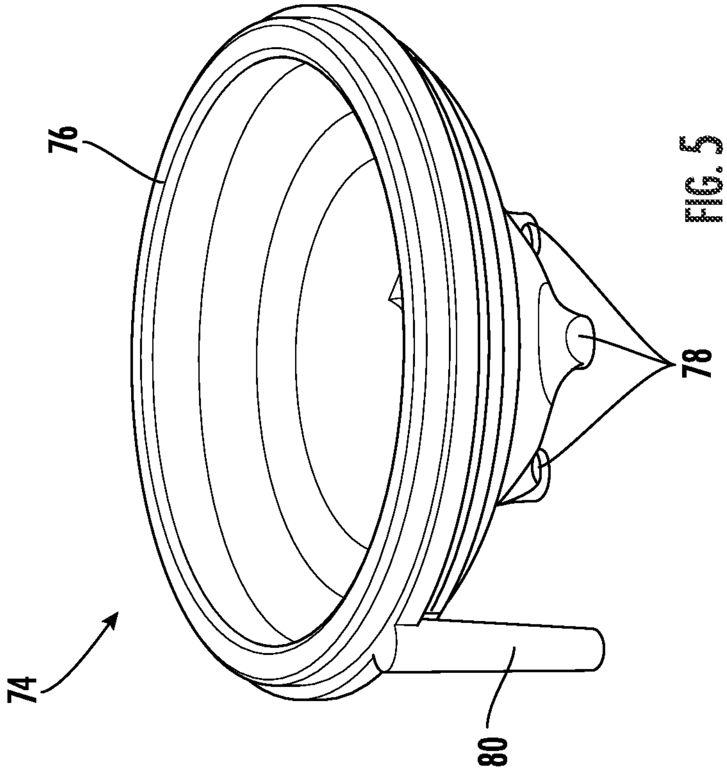
FIG. 5 is a perspective view of a light transmission device of the life safety device according to an embodiment.
Figure 6:
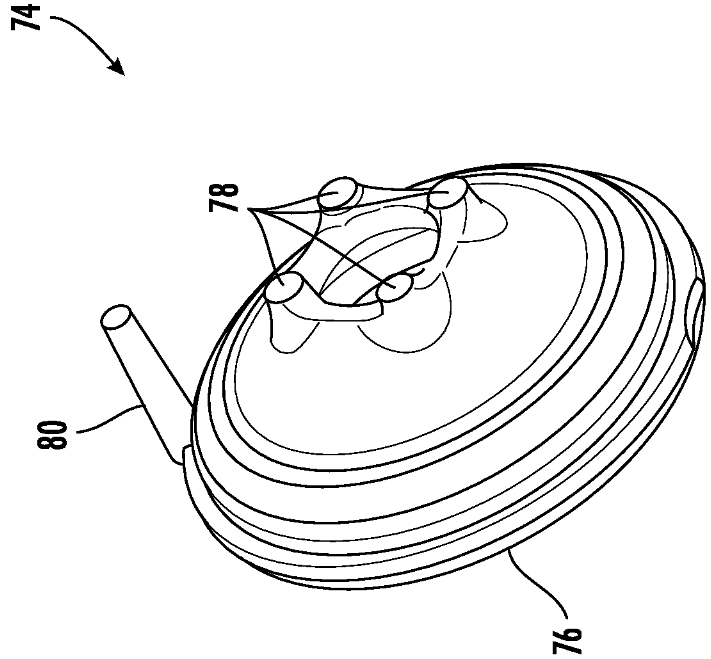
FIG. 6 is another perspective view of a light transmission device of the life safety device according to an embodiment.

An example of the light transmission device 74 is illustrated in more detail in FIGS. 5 and 6 In the illustrated non-limiting embodiment, the light transmission device 74 is hollow and generally conical or frustoconical in shape. However, other shapes are also within the scope of the disclosure. A first end 76 of the light transmission device 74 may extend through an opening formed in the lower housing portion 26 adjacent the actuatable mechanism 50. In an embodiment, the first end 76 of the light transmission device 74 is concentric and therefore coaxial with the actuatable mechanism 50 relative to the lower housing portion 26. As a result, an inner diameter of the light transmission device 74 adjacent the first end 76 is generally equal to or complementary to an outer diameter of the actuatable mechanism 50. However, embodiments where the light transmission device 74 is spaced away from or apart from the actuatable mechanism 52 are also within the scope of the disclosure.

The light transmission device 74 additionally includes at least one port 78 located adjacent the at least one LED 70 for communicating light to the first end 76. In embodiments where the visual warning system 68 includes a plurality of LEDS 70, the light transmission device 74 may include a plurality of ports 78, each of which is associated with a distinct LED 70 of the plurality of LEDs. However, in other embodiments, a port 78 may be associated with more than one of the plurality of LEDs 70. In the illustrated, non-limiting embodiment, the visual warning system 68 includes at least two LEDs. A first LED **70*a* has a first color, such as green for example, and the second LED 70*b* has a second distinct color, such as red for example. The LEDs 70** may be operated independently to generate either the first color or the second color, and may be operated in unison to create a third color, distinct from the first and second colors.

As an example, a green LED **70*a* may be operated in unison with a red LED 70*b* to create a yellow color. However, embodiments where the system 68 includes another LED having a third color associated therewith are also contemplated herein. As another example, if a blue LED is included, a red LED 70*a* and a blue LED 70*b* may be operated in unison to create magenta; in yet another example, a green LED 70*a* and a blue LED 70*b* may be operated in unison to create cyan. In addition, it should be understood that the system 68 may include one or more LEDs associated with each color, such as two green LEDs and two red LEDs for example. This may allow different levels of brightness. Additional colors may be operated independently. Further, it should be understood that a system 68 having any number of LEDS 70**, including one LED or more than two LEDs, as well as any number of colors associated therewith is contemplated herein.

In addition, the light transmission device 74 has a bi-directional configuration. Accordingly, light is not only transmitted from the at least one LED 70 through the device 74 to the exterior of the housing 22, but also ambient light may be transmitted through the light transmission device 74 to a sensor capable of measuring the ambient light to determine a time of day and select a corresponding mode of operation. The at least one LED 70 may be operable as the sensor for measuring ambient light. In such embodiments, the at least one LED 70 converts ambient light transmitted thereto into a voltage that can be used to identify a corresponding time of day. The at least one LED 70 is therefore operable as both a transmitter for generating light, and a receiver for receiving and measuring ambient light. In the illustrated, non-limiting embodiment, a distinct LED, **70*c***, is configured as the sensor for measuring ambient light.

Figure 7:
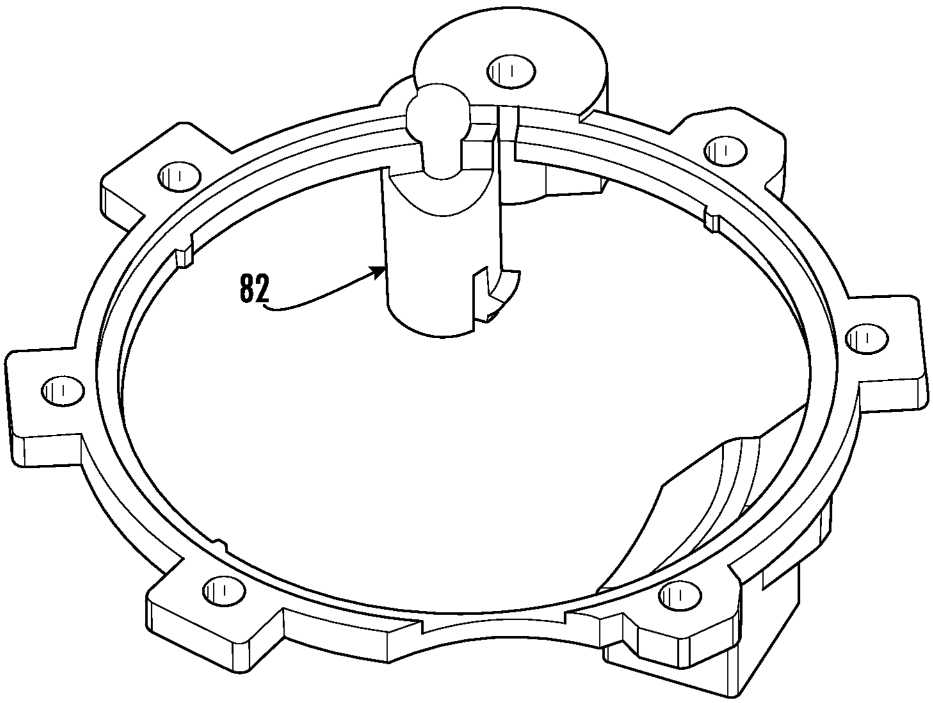
FIG. 7 is a perspective view of a blocking material associated with the light transmission device according to an embodiment.

In the illustrated, non-limiting embodiment, the light transmission device 74 additionally includes a post 80, separate from the ports 78, for communicating ambient light to the sensor, LED **70*c*. The post 80 may be encased within a light blocking material 82, illustrated in FIG. 7, to prevent light transmitted by any of the plurality of LEDs 70 from interfering with the ambient light. Light blocking material 82 may be disposed between light transmission device 74 and lower housing portion 26. As shown, the post 80 is radially offset from the center of the light transmission device 74, but other configurations of post 80 and light blocking material 82** are within the scope of the disclosure.

During operation of the device 20, ambient light is communicated through the light transmission device 74, specifically through the post 80, to the adjacent LED 70*c*. The microcontroller 60 processes the voltage information provided by LED 70*c* to determine a time of day and control operation of the device 20 in either a daytime mode or night time mode.

Figure 8:
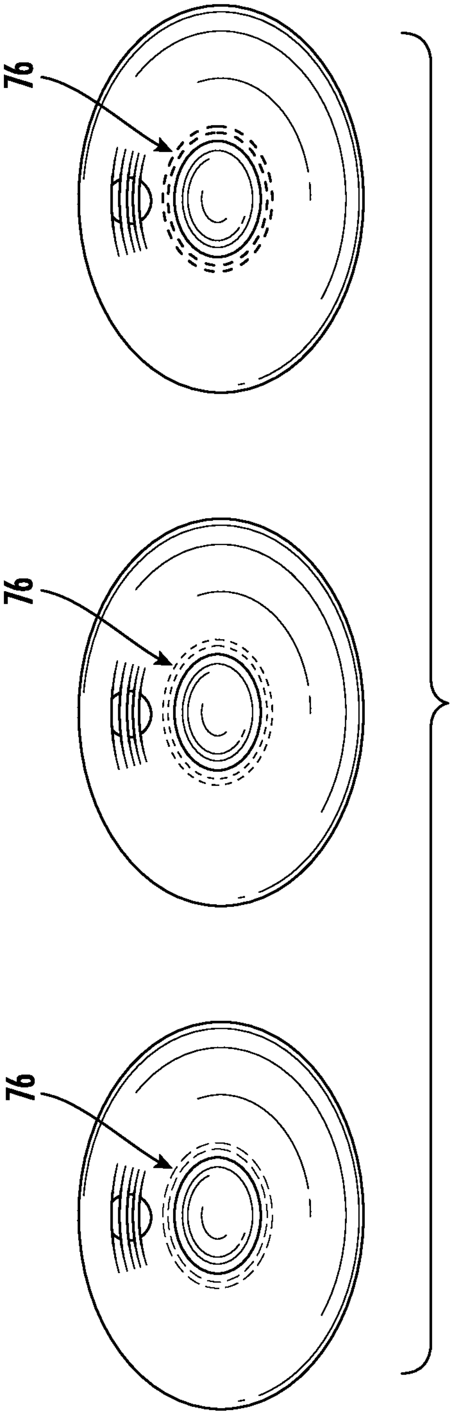
FIG. 8 is a perspective view of a life safety device in various conditions according to an embodiment.

In the daytime mode, the visual warning system 68 continuously indicates a status of the detected conditions and/or of the device 20. With reference to FIG. 8, in the illustrated, non-limiting embodiment, if no condition has been detected by the device 20, a first LED, such as the green LED 70*a* for example, is illuminated. The light generated by the first LED 70*a*, is transmitted through an adjacent port 78 in the light transmission device 74 to illuminate the first end 76 of the device 74. If a dangerous condition has been detected, such as an unacceptable level or either carbon monoxide or smoke for example, a second LED, such as the red LED 70*b*, will be operated. The light from the LED 70*b* will transmit through an adjacent port 78 in the light transmission device 74 to illuminate the first end 76 of the device 74, visible at the exterior of the housing 22.

In an embodiment, if an error within the device 20 is detected, both the first LED 70*a* and the second LED 70*b* are operated. The red and green light are transmitted into the light transmission device 74 where they mix to create a yellow light visible at the first end 76 thereof. Accordingly, a first color is visible at the exterior of the housing 22 during a first condition, a second color visible at the exterior of the housing 22 during a second condition, and in some embodiments, a third color is visible at the exterior of the housing 22 during a third condition. The colors and functions illustrated and described herein are intended as an example only. Other exemplary conditions such as a pending or unconfirmed alarms may be demonstrated with additional colors or light patterns.

In some embodiments, when operating in the daytime mode, the LED 70*c* operating as the ambient light sensor may be configured to continuously measure the ambient light and/or provide an indication of the ambient light to the microcontroller 60. Alternatively, the LED 70*c* may be configured to measure the ambient light and/or provide an input of the ambient light to the microcontroller 60 at intervals. In an embodiment, upon detection of a reduced amount of ambient light indicating a time of day after sunset or that the lights within an area adjacent the device 20 are not on, operation of the first and second LEDs 70*a*, 70*b* is generally discontinued and the device 20 is transitioned to operation in a night time mode. However, it should be understood that upon detection of a corresponding condition, these LEDs 70*a*, 70*b* may be activated regardless of whether the device 20 is in a daytime mode or a night time mode. Furthermore, the operation of the LEDs 70*a*-70*n* may differ depending on the current state of the device 20, e.g. if the device is in test or setup mode.

In the night time mode, the LED 70*c* is selectively operated as both a receiver and transceiver. Power is supplied to the LED 70*c* in a manner causing the LED 70*c* to pulse or flash to reduce the level or nuisance to a person nearby. In an embodiment, the brightness of the LED 70*c* is less than the brightness of the LEDs 70*a*, 70*b*. When the LED 70*c* is illuminated, light transmits through the post 80 to the end 76 of the light transmission device 74. During the periods between the flashes, a measurement of the ambient light communicated to the LED 70*c* via the post 80 is taken. Upon determining that the lights within the area adjacent the devices 20 are on or that the sun has risen, the device 20 will transform to the daytime mode.

Although the LED 70*c* for measuring the ambient light is illustrated and described herein as being distinct from the LEDS 70*a*, 70*b* operable during the daytime mode, it should be understood that the same LED may be used in both modes of operation. For example, the LED 70*c* may be a green LED, operable in place of LED 70*a* during the daytime mode. Further, the intensity level of the color output by such an LED may vary based on the mode of operation of the device 20. In an embodiment, the intensity of the color output by the LED may be controlled via the current supplied thereto or via pulse width modulation. In some embodiments, LED 70*c* may be a separate color LED 70*c* as described above, or in some embodiments may the same LED as LED 70*a* or 70*b*. In embodiments where an alternate light source incapable of communicating voltage based on ambient light, or in other embodiments where a separate LED is desirable, LED 70*c* may function to provide voltage information from received ambient light rather than to transmit light.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A life safety device comprising:

a housing;

a transmitter for generating a light, the transmitter being positioned within the housing;

a receiver for measuring ambient light around the life safety device, the receiver being positioned within the housing adjacent the light transmission device; and a light transmission device disposed within the housing adjacent to the transmitter, a first end of the light transmission device being visible at an exterior of the housing, the light transmission device including:

at least one port located adjacent to the transmitter and being operable to communicate light from the transmitter to a first end; and a post separate from the port for communicating the ambient light to the receiver;

wherein in a first mode of operation of the life safety device, a first light source is operable as the transmitter and a second light source is operable as the receiver and in a second mode of operation of the life safety device, the second light source is operable as both the transmitter and the receiver.

2. The life safety device of claim 1, wherein at least one of the first light source and the second light source is a light emitting diode.

3. The life safety device of claim 1, further comprising a control system operably coupled to the transmitter and the receiver, wherein the control system determines an operating mode of the life safety device in response to the ambient light measured.

4. The life safety device of claim 3, wherein the first mode is a daytime mode and the second mode is a night time mode.

5. The life safety device of claim 4, wherein the first light source has a first color, and the second light source has a second color, the first color and the second color being distinct.

6. The life safety device of claim 5, further comprising a third light source, wherein in the daytime mode, the first light source and the third light source are operable as the transmitter.

7. The life safety device of claim 6, wherein the second light source is radially offset from the first light source and the third light source relative to the light transmission device.

8. A method of operating a life safety device comprising:

detecting ambient light adjacent to the life safety device via a first end of a light transmission device; and sensing a condition via at least one detector of the life safety device; and illuminating an indicator visible at an exterior of the life safety device in response to the sensed condition via a transmitter, the indicator being arranged at the first end of the light transmission device;

wherein in a first mode, detecting ambient light is performed by a first light source and illuminating the indicator is performed by a second light source and in a second mode, detecting ambient light and illuminating the indicator are performed by the first light source.

9. The method of claim 8, wherein at least one of the first light source and the second light source is a light emitting diode.

10. A life safety device comprising:

a housing;

an actuatable mechanism coupled to the housing;

a detector coupled to the housing, wherein the detector senses one or more conditions adjacent to the life safety device; and a visual warning system disposed within the housing, the visual warning system including:

an indicator at least partially visible at the exterior of the housing, the indicator being arranged adjacent to the actuatable mechanism at the exterior of the housing; and a plurality of light sources operable to illuminate the indicator, wherein a color used to illuminate the indicator is selected in response to the condition sensed by the detector;

wherein operation of the at least one light source for illuminating the indicator varies based on a time of day, wherein a first light source of the plurality of light sources is only used to illuminate the indicator during a first time of day and a second light source of the plurality of light sources is only used to illuminate the indicator during a second time of day.

11. The life safety device of claim 10, wherein the at least one light source includes a first light source, a second light source, wherein the first light source has a first color, and the second light source has a second color, the first color and the second color being distinct.

12. The life safety device of claim 11, wherein the first light source is used to illuminate the indicator in response to a first condition sensed by the detector and the second light source is used to illuminate the indicator in response to a second condition sensed by the detector.

13. The life safety device of claim 12, wherein both the first light source and the second light source are used to illuminate the indicator in response to a third condition sensed by the detector.

14. The life safety device of claim 10, wherein the indicator includes a bi-directional, passive light transmission device positioned generally adjacent the at least one light source.

15. The life safety device of claim 10, wherein the at least one light source is operable as a receiver for measuring ambient light adjacent the life safety device, the receiver being positioned within the housing adjacent the light transmission device.

16. The life safety device of claim 10, wherein the at least one light source is a light emitting diode.

* * * * *